(12) United States Patent
Watson

(10) Patent No.: US 9,377,341 B1
(45) Date of Patent: Jun. 28, 2016

(54) ELECTRONIC LIQUID LEVEL SENSING DEVICE AND GAUGE FOR LIQUID-IMMERSED POWER TRANSFORMERS, REACTORS AND SIMILAR EQUIPMENT

(71) Applicant: Joe David Watson, Jupiter, FL (US)

(72) Inventor: Joe David Watson, Jupiter, FL (US)

( * ) Notice: Subject to any disclaimer, the term of this patent is extended or adjusted under 35 U.S.C. 154(b) by 151 days.

(21) Appl. No.: 14/518,777

(22) Filed: Oct. 20, 2014

Related U.S. Application Data

(63) Continuation-in-part of application No. 13/861,689, filed on Apr. 12, 2013, now abandoned.

(51) Int. Cl.
*G01F 23/18* (2006.01)
*G01F 23/14* (2006.01)
*G01F 23/20* (2006.01)

(52) U.S. Cl.
CPC ............. *G01F 23/18* (2013.01); *G01F 23/14* (2013.01); *G01F 23/20* (2013.01)

(58) Field of Classification Search
CPC ....... G01F 23/20; G01F 23/14; G01F 23/185; G01F 23/247; G01F 23/168; G01F 23/246
See application file for complete search history.

(56) References Cited

U.S. PATENT DOCUMENTS

| | | | | |
|---|---|---|---|---|
| 3,449,633 A * | 6/1969 | Schroeder | ............. | H01F 27/402 340/646 |
| 4,625,553 A * | 12/1986 | Charter | ..................... | G01N 9/26 73/438 |
| 6,282,953 B1 * | 9/2001 | Benjey | ................. | B60K 15/077 73/1.32 |
| 7,032,449 B2 * | 4/2006 | Rivas | ....................... | G01N 9/26 73/299 |
| 7,049,922 B2 * | 5/2006 | Sabau | ...................... | H01F 27/14 336/55 |
| 7,882,736 B2 * | 2/2011 | Schumacher | ......... | G01F 23/164 73/292 |
| 8,370,088 B2 * | 2/2013 | Ammouri | ............. | F17C 13/021 702/156 |
| 8,400,320 B2 * | 3/2013 | Santos | ................ | G01F 23/0076 340/501 |
| 8,479,572 B2 * | 7/2013 | Onishi | ........................... | 73/149 |
| 2003/0172716 A1 * | 9/2003 | Braesel | .............. | G01N 33/2841 73/19.1 |
| 2008/0213874 A1 * | 9/2008 | Mitchell | ................. | G01F 23/14 435/287.1 |
| 2009/0063060 A1 * | 3/2009 | Sun | ........................ | G01F 23/265 702/52 |
| 2009/0180514 A1 * | 7/2009 | Anderson | ............... | H01F 27/12 374/54 |
| 2009/0231075 A1 * | 9/2009 | Moia | ........................ | H01F 27/12 336/61 |
| 2010/0274529 A1 * | 10/2010 | Altmann | .............. | G01R 31/027 702/183 |
| 2011/0000295 A1 * | 1/2011 | Kritlow | ................... | G01F 23/18 73/299 |
| 2012/0192646 A1 * | 8/2012 | Arnold | ................ | G01F 23/0053 73/292 |

* cited by examiner

Primary Examiner — David A Rogers
(74) Attorney, Agent, or Firm — John Ryznic

(57) ABSTRACT

The present invention is a unique system for liquid-immersed transformers and reactors with complex internal thermal gradients that provides telemetry on multiple transformer or reactor conditions including: the level and volume of the liquid, the integrity of the winding clamping, the overall tank pressure, the gas pressure for gas blanketed transformers, and the condition of the breather for conservator type transformers or reactors, and the impacts from ballistics on the tank or cooling system. The present invention can be used on conservator type or gas blanketed type transformers. The liquid level can be calculated at any level in the transformer or reactor by the location of the oil pressure sensor at the bottom of the tank. The method for calculating liquid level does not require liquid temperature measurement. Average liquid temperature is calculated rather than estimated from discrete measurements, providing accurate average temperature values under all operating conditions.

6 Claims, 7 Drawing Sheets

ELECTRONIC LIQUID LEVEL SENSING DEVICE AND GAUGE FOR LIQUID-IMMERSED POWER TRANSFORMERS, REACTORS AND SIMILAR EQUIPMENT

CROSS-REFERENCE TO RELATED APPLICATIONS

This application is a CONTINUATION-IN-PART of U.S. patent application Ser. No. 13/861,689 filed Apr. 12, 2013 and entitled ELECTRONIC LIQUID LEVEL SENSING DEVICE AND GAUGE FOR LIQUID-IMMERSED POWER TRANSFORMERS, REACTORS AND SIMILAR EQUIPMENT.

GOVERNMENT LICENSE RIGHTS

None.

BACKGROUND OF THE INVENTION

1. Field of the Invention

The present invention relates generally to a liquid immersed power transformer, and more specifically to an apparatus and a process of measuring a liquid level within a transformer without mechanical gauges.

2. Description of the Related Art Including Information Disclosed Under 37 CFR 1.97 and 1.98

Liquid-immersed power transformers, reactors and similar equipment are filled with a liquid to provide electrical insulation for, and transfer heat from, an energized internal component such as the core and windings, also referred to as the active part in the case of a transformer. The liquid can be mineral oil, synthetic oil, vegetable oil, or other liquids that provide the thermal and electrical performance requirements. The terms liquid or oil and the terms transformer or reactor have the same meaning.

The oil volume must be maintained at a level that is sufficient to cover all energized parts that need electrical insulation to prevent electrical failure, as well as a sufficient volume to transfer the heat energy produced by the active part to the radiators or heat exchangers for heat removal and maintaining the active part at safe operating temperatures where thermal damage will not occur.

Liquid-immersed power transformers have oil containment systems that can be classified in to two general categories that includes 1) gas-blanketed or 2) conservator type transformers equipped with oil expansion tanks. Both systems allow the oil level to rise and fall within a normal operating range with dynamic changes in operating and ambient temperatures.

While several transformer conditions can be monitored by measuring static and dynamic pressure, the only devices utilizing pressure measurement to-date have been electronic rapid pressure rise relays and gas pressure monitors for gas-blanketed transformers.

The pressure monitoring device covered under these specifications provides the ability to monitor liquid level, liquid volume, winding clamping condition, breather condition and to provide alarms on tank pressure and loss of liquid.

The current state of the art for oil level gauges is a mechanical gauge with a float mounted to a float arm. The top oil level in transformers with expansion tanks rises and falls within its normal operating range in an expansion tank as shown in FIG. 1. The top oil level in transformers with gas-blanketed designs rises and falls within its' normal operating range in the main transformer tank as shown in FIG. 2. In transformers with expansion tank designs, typical mechanical oil level gauges are mounted on the expansion tank with a long float arm inside the expansion tank that floats at the top level of the oil. In transformers with gas-blanketed designs, a typical mechanical gauge is mounted on the tank wall and utilizes an internal radial float arm that floats at the top level of the oil.

Mechanical gauges have a few drawbacks. They have a limited range of operation. The float arm can only move over a limited range so liquid levels below the minimum level or above the maximum level cannot be measured with a single gauge. Float arms can be bent or damaged easily. Float arms and floats can cause damage to flexible bladders that are often used inside expansion tanks to isolate the liquid from the outside air. Damaged flexible bladders can collapse inside the expansion tank and lay on top of the float arm, preventing the float from floating at the top level of the liquid and displaying a correct oil level. Mechanical gauges are constructed in two magnetically coupled parts and require gasketed seals between the internal float arm assembly and the outside gauge display assembly. These gasket seals degrade with time and temperature, and can be damaged by improper installation or maintenance, causing oil leaks and environmental problems. Mechanical gauges may be located in an area that is difficult to see due to interferences at the service location. Relocating mechanical gauges is not practical. The vast majority of mechanical oil level gauges are equipped with microswitches to provide high and low level alarms, but the measured liquid level can only be determined by looking at the gauge, although some gauges have been developed recently with remote level indication. A mechanical gauge can only indicate liquid level, and cannot determine liquid volume because it does not measure or compensate for liquid temperature which can lead to improper filling when the transformer is filled with oil or similar problems.

Alternate pressure sensing designs have been proposed that utilize a pressure transducer on the bottom of the conservator tank and require temperature sensors to measure liquid temperature in the main tank. This type of system also has drawbacks including: the ability to measure liquid level is restricted to the area above the transducer so only the liquid level in the conservator tank can be measured; the system can only be used on conservator type transformers or reactors and not on gas blanket designs; the temperature of the liquid in the conservator tank must be estimated and extrapolated from the temperatures measured on the main tank which leads to low accuracy when calculating liquid density, specific gravity or thermal volume; the system requires direct thermal measurements for liquid level calculations; and, rapid detection of leaks is not possible.

BRIEF SUMMARY OF THE INVENTION

The present invention is a unique system for liquid-immersed transformers and reactors with complex internal thermal gradients that provides telemetry on multiple transformer or reactor conditions including: the level and volume of the liquid, the integrity of the winding clamping, the overall tank pressure, the gas pressure for gas blanketed transformers, and the condition of the breather for conservator type transformers or reactors, and the impacts from ballistics on the tank or cooling system. The present invention can be used on conservator type or gas blanketed type transformers.

The liquid level can be calculated at any level in the transformer or reactor by the location of the oil pressure sensor at the bottom of the tank. The method for calculating liquid level does not require liquid temperature measurement. Average liquid temperature is calculated rather than estimated from discrete measurements, providing accurate average temperature values under all operating conditions.

The liquid volume can be calculated from the liquid level and tank geometry for conservator type transformers and reactors. For gas blanketed transformers, the pressure due to the liquid is effectively constant in the upper tank area over normal liquid levels due to the linear relationship between liquid level and liquid volume, so a loss of volume can be detected whenever the total pressure at the bottom of the tank drops below the normal liquid pressure plus gas pressure.

The system measures the pressure above the oil and near the bottom of the tank. The liquid level and volume calculation process is different for conservator and gas-blanketed transformers or reactors.

The conservator type transformer or reactor calculation process is as follows: Using an initial estimated average temperature, the invention calculates the corresponding estimated average specific gravity of the oil from the various regions of oil in the tank. This data is then used to calculate an estimated oil level, or oil height above the pressure transducer, using Pascal's law. The estimated oil height is then used to calculate the estimated oil volume, using calculations specific to the shape and dimensions of the expansion tank and the baseline liquid volume at a reference temperature. The estimated oil expansion is then used to also calculate the corresponding average oil temperature. If the estimated average oil temperature used to calculate the estimated oil height is not within the accuracy requirement for the average oil temperature calculated from the resulting oil volume at the estimated oil height, or if the liquid level is not within the required accuracy level, the average value of the two different temperatures is calculated then the oil height and oil volume are recalculated and this iteration process is repeated until the results are within the required accuracy level. The process must be repeated regularly on a time based cycle, or when measured data change more than pre-set bandwidth values.

The gas-blanketed type transformer or reactor calculation process is as follows: The invention measures the upper and lower pressures. The lower pressure is the sum of the upper gas pressure plus the pressure from the liquid. In the upper portion of the liquid where the liquid can expand and contract between normal high and normal low liquid levels, the geometry of the tank is simple and the relationship between changes in liquid height and volume are linear as well as the liquid specific gravity or density and thermal expansion. As a result, for the normal operating levels, the pressure from the liquid is essentially constant over the range of liquid levels from the critical low level to the high alarm level or higher. Consequently, the pressure from the liquid can be treated as a constant (Po) and the liquid level is calculated from the measured pressure of the gas above the liquid. A loss of liquid volume is detected when the total pressure measured at the tank bottom is less than the upper gas pressure plus (Po). The calculations for gas-blanketed transformers and reactors do not require iterative calculations. The average liquid temperature can be calculated from the liquid level and initial temperature and level measurements.

For all transformer or reactor types: for winding clamping condition monitoring, the present invention measures the high frequency vibrations sensed by the lower pressure sensor and compares the values to baseline data to detect if the mechanical integrity of the winding clamping system has deteriorated.

For tank pressure monitoring, the system calculates the pressure at the level of the pressure relief device and if the pressure is higher than normal, issues a warning alarm if the pressure relief device is expected to release or spill liquid if the rise in pressure continues at the current rate.

For the breather condition monitor, the device compares the range of maximum and minimum upper pressures to previous values to detect restriction in the breather system.

For ballistic impact monitoring, the device detects high frequency impulses in the liquid to issue a warning of possible impacts and to trigger the leak detection algorithms.

The invention offers the following improvements over the prior art. The elimination of a mechanical float assembly and the corresponding ability to determine the oil level at any volume in the tank from 0 to 100%, also eliminating the need for multiple mechanical oil level gauges on some transformers. The ability to discern the difference between a low oil level that is due to incomplete filling or lower than expected temperatures and a low oil level that is due to loss of oil in the tank from leaks or oil removal. The ability to monitor vibrations in the oil due to winding movement during operation and the ability to detect increases in harmonic vibration frequencies when winding clamping deteriorates. The ability to detect ballistic impacts on the tank or cooling system and trigger alarms or leak detection algorithms. The ability to detect over-pressure conditions before pressure is vented and oil is released. The ability to detect high or low gas pressure conditions in gas blanketed or sealed tank transformers. The ability to detect clogged breathers in conservator type transformers. The ability to provide reliable oil level data even if the bladder is damaged in a conservator type transformer. The ability to issue proactive or Smart Alarms based on trending data, before the alarm condition occurs

DETAILED DESCRIPTION OF THE INVENTION

The present invention is an apparatus and a process for an electronic liquid level measuring device and gauge for liquid-immersed power transformers, reactors or similar equipment with complex and dynamic liquid temperature distributions that utilizes measured liquid pressure and temperature measurements with programmed settings and algorithms to determine the level and volume of liquid oil in the transformer. The measuring device also has capabilities of providing output data or display for the liquid level, liquid volume, and measured data as well as alarms for adverse operating conditions.

Liquid level and volume monitoring function: The pressure of the oil measured at the bottom of the transformer tank is related to the pressure above the oil and the height of the oil above the pressure sensor by Pascal's law $$P=\rho g h$$

where P=the pressure, $\rho$=the oil specific gravity, g=the gravitational constant, and h=the height and $\rho$ is a function of the oil expansion constant, $\beta$, and temperature or $$\rho_n = \rho_0 \beta(t_{aven} - t_0).$$

Figure 1:
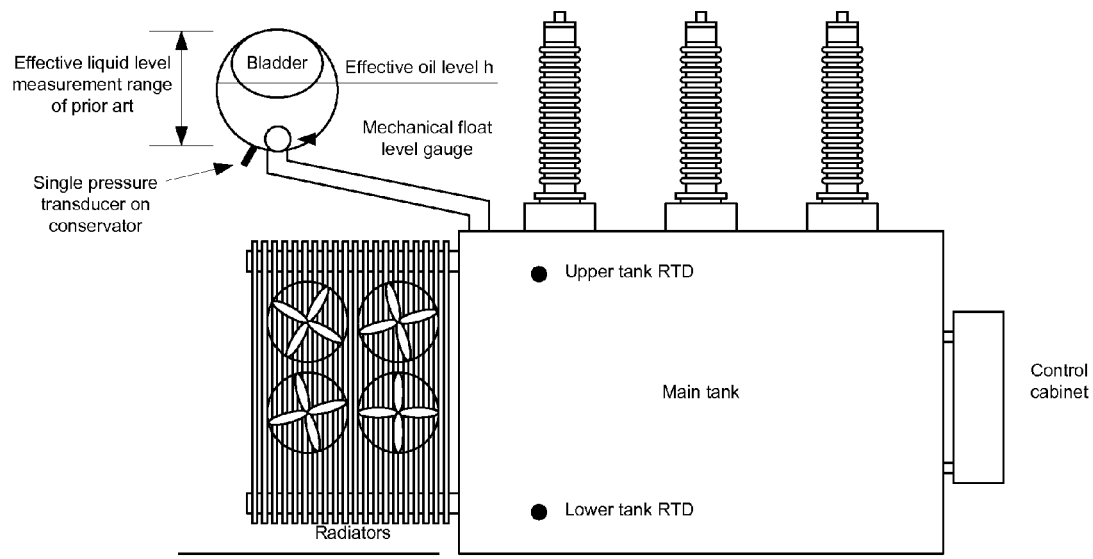
FIG. 1 shows a prior art conservator oil preservation type transformer with the pressure and temperature sensors located as shown, and an effective liquid level that is measured by the apparatus and process of the present invention.
Figure 2:
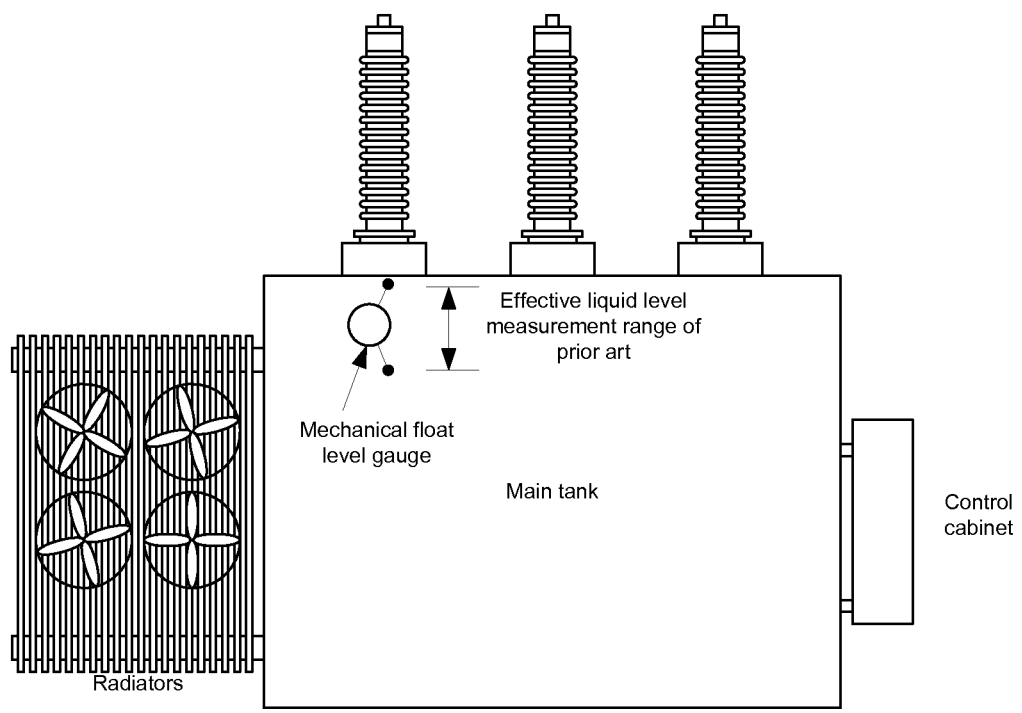
FIG. 2 shows a prior art gas blanket or sealed tank oil preservation type transformer with the pressure and temperature sensors locations as shown, and an effective liquid level that is measured by the apparatus and process of the present invention.
Figure 3:
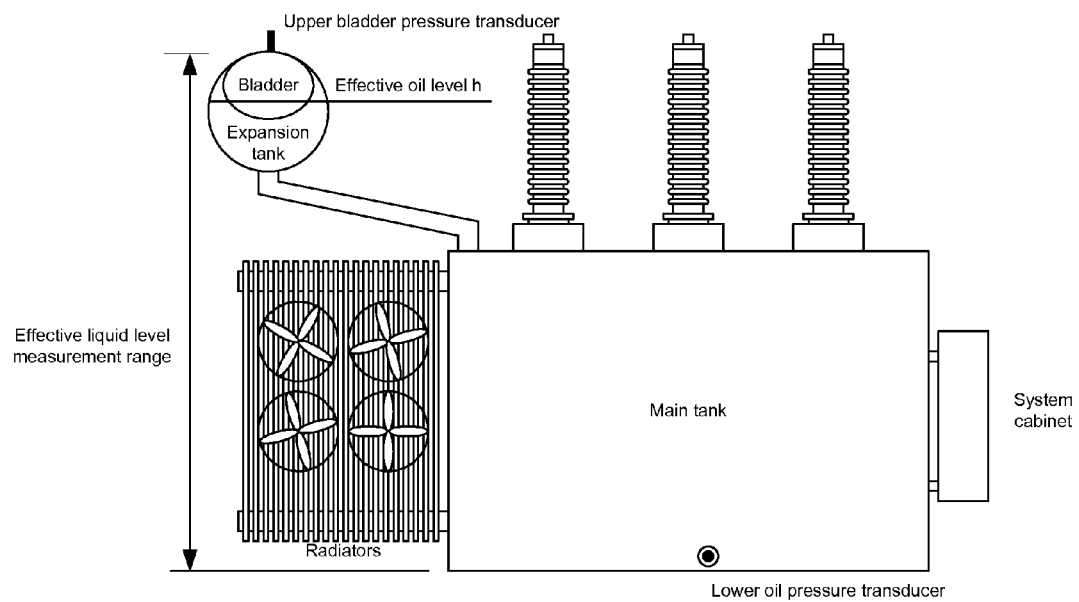
FIG. 3 shows a conservator oil preservation type transformer or reactor with the pressure sensor general locations and effective liquid level (h) that is measured by the present invention.
Figure 4:
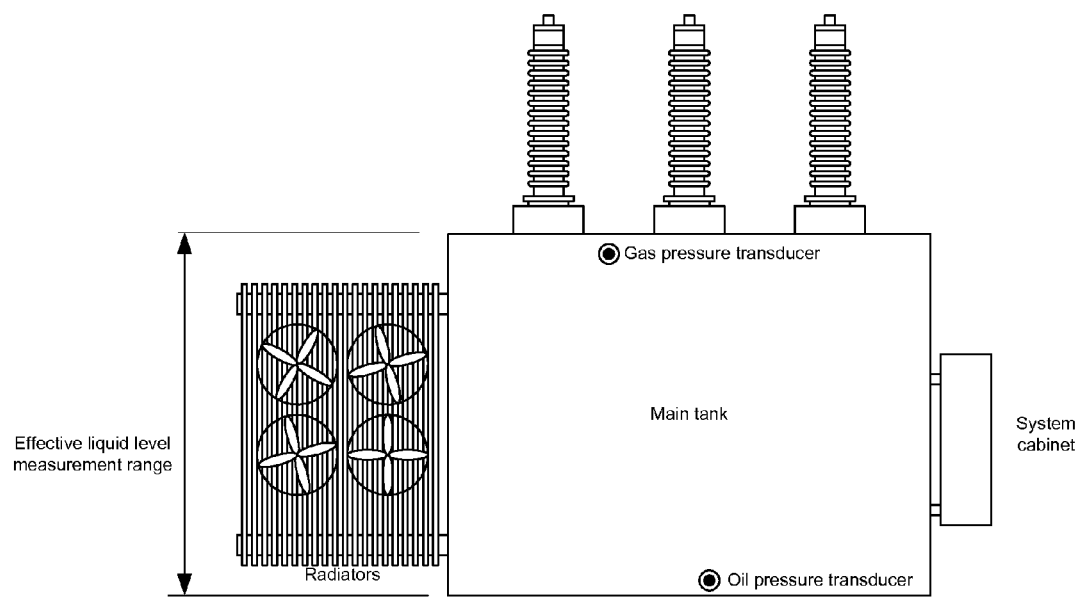
FIG. 4 shows a gas blanket or sealed tank oil preservation type transformer or reactor with the pressure sensor general locations and the effective liquid level (h) that is measured by the present invention.
Figure 5:
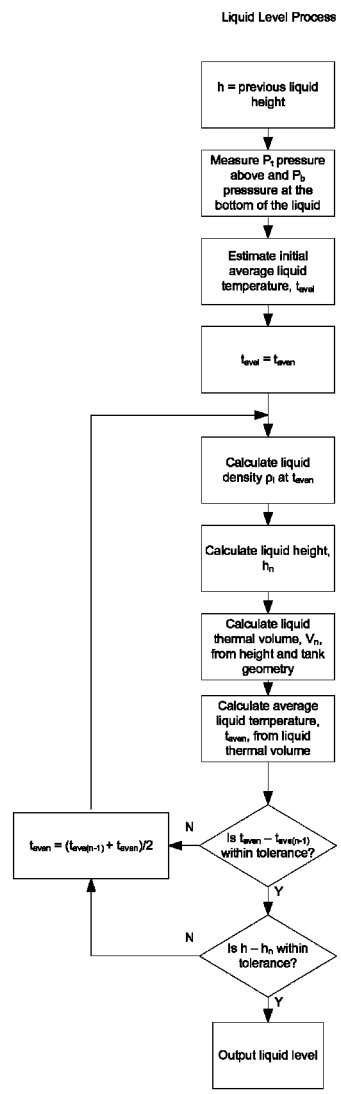
FIG. 5 shows a logic diagram for the calculation of the liquid level for the conservator type transformers or reactors of the present invention.
Figure 6:
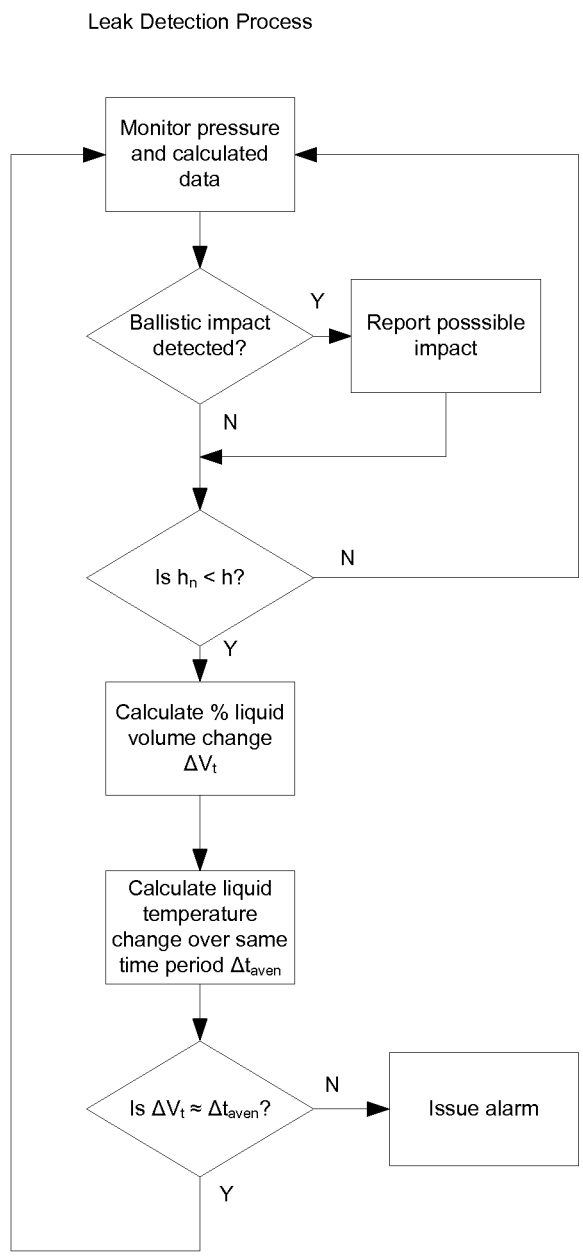
FIG. 6 shows a logic diagram for the calculation of leak detection for the conservator type transformers or reactors of the present invention.
Figure 7:
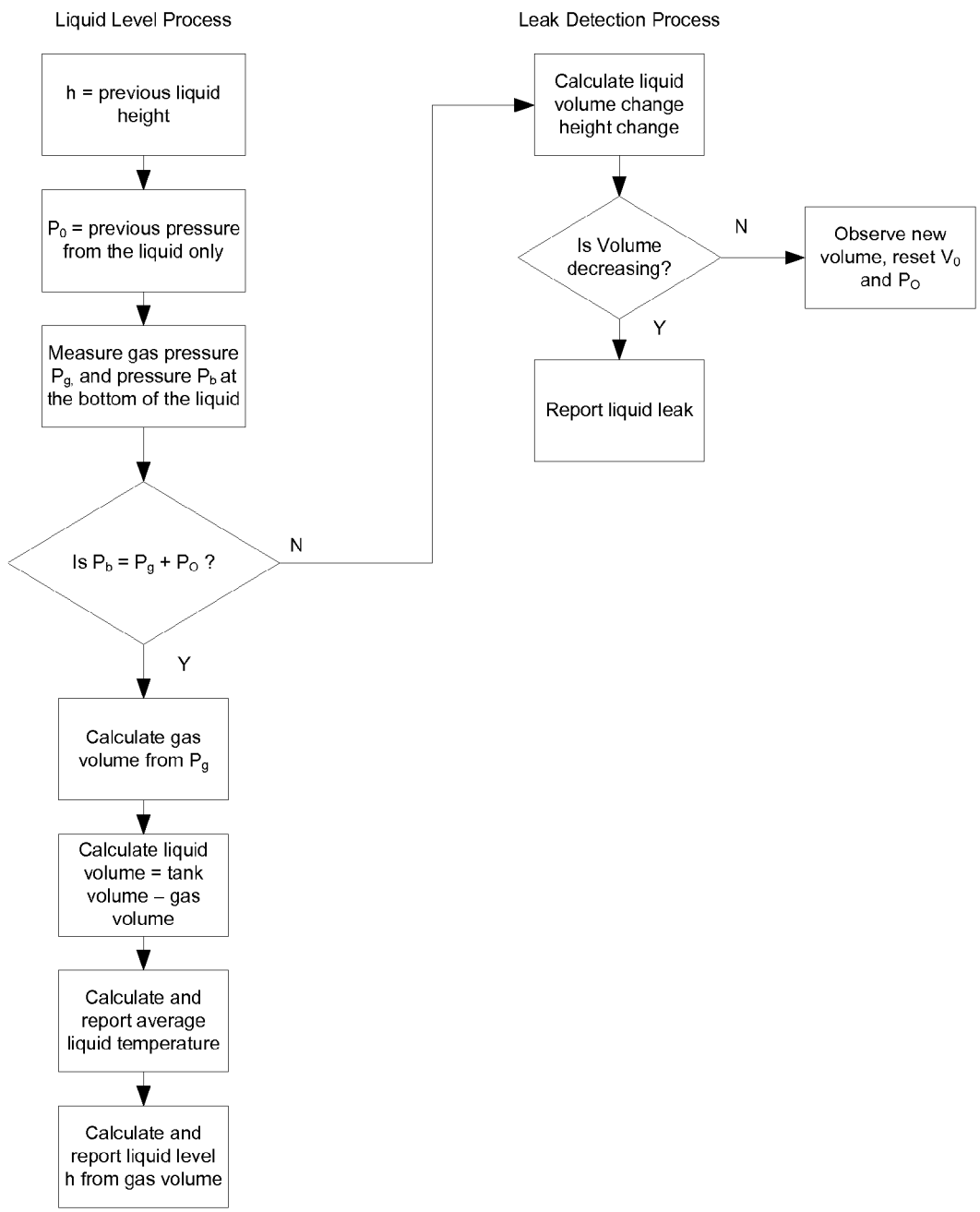
FIG. 7 shows a logic diagram for the calculation of the liquid level and leak detection for the gas blanketed type transformers or reactors of the present invention.

The reference oil temperature ($t_0$) is the average liquid temperature which is measured when the tank is filled with the liquid at a consistent temperature. For conservator type designs (FIG. 3), the average oil temperature ($t_{aven}$) calculated at iteration (n) is initially an estimated value or, alternately, the output from a temperature measurement device to provide the initial temperature estimate ($t_{avei}$). For gas-blanketed designs (FIG. 4), the average liquid temperature can be calculated from the liquid level and baseline liquid volume ($V_0$) at a reference temperature ($t_0$).

For conservator type designs (FIG. 3): the calculated average oil temperature is used to estimate the specific gravity and thermal oil expansion of the oil in the tank which is distributed in a complex arrangement of thermal gradients throughout the tank due to the dynamic operating conditions and heating inside the tank.

The measured pressure value will vary with thermal expansion or contraction and corresponding rise or fall of the oil level in conservator expansion tanks and the corresponding thermal change in the specific gravity of the oil. The relationship between the change in oil volume and change in oil level in the expansion tank will depend on the geometry and dimensions of the expansion tank.

The volume of oil in a transformer with an expansion tank is modeled as the volume of oil below the expansion tank, which must be measured and thermally corrected when the transformer is filled, plus the volume of oil in the expansion tank which can be calculated from the internal tank geometry and dimensions.

In the present invention, the oil level measurement and calculation process for expansion tank type is as follows: The pressure ($P_b$) is measured at the bottom of the tank and pressure ($P_t$) is measures above the oil. The pressure due to the oil is calculated as $P=(P_b)-(P_t)$. An estimated oil temperature ($t_{avei}$) is first estimated and used to calculate the initial estimate of the specific gravity of the oil ($\rho_i$).

The initial oil height is calculated as ($h_i = P/\rho_i g$).

The calculated oil height is then used to calculate the total volume of oil in the transformer and expansion tank for expansion tank designs.

The total calculated oil volume is then used to calculate the average oil temperature ($t_{aven}$) at iteration (n) using the oil expansion constant and volume at 20° C. and the following calculation:

$$V_n = V_0/\beta(t_{aven} - t_0).$$

The iterative process continues with a new calculation of liquid height using the equation $$h_n = P/\rho_n g$$

followed by recalculation of the liquid volume ($V_n$) and average liquid temperature ($t_{aven}$), where: ($P_b$) is the pressure measured at the bottom of the liquid; ($P_t$) is the pressure measured above the liquid; (P) is the pressure due solely to the liquid density and height ($P_b - P_t$); ($V_n$) is the calculated oil volume at the measured temperature ($t_{aven}$) at iteration (n); ($V_0$) is the measured oil volume at the reference oil temperature ($t_0$) (20° C. is a commonly used reference temperature but the volume could be measured at another temperature and corrected to 20° C.); ($\beta$) is a linear equation that is in the range of about 0.0007/° C. or mineral oil at 20° C.; ($t_{avei}$) the initial estimated average oil temperature; ($t_{aven}$) is the average oil temperature calculated at iteration (n); ($t_0$) is the baseline average oil temperature at liquid volume ($V_0$); ($\rho_n$) is the initial liquid specific gravity at estimated average oil temperature ($t_i$); ($\rho_n$) is the liquid specific gravity calculated at iteration (n) with average oil temperature ($t_n$); ($h_1$) is the liquid height calculated in the first iteration; ($h_n$) is the liquid height calculated in iteration (n); and (h) is the liquid height calculated in the final iteration.

The calculated average oil temperature ($t_{aven}$) from the oil volume calculation is then compared to the average oil temperature ($t_1$) used in the height calculation with the measured pressure. If the $t_{aven}$ minus $t_{ave}(n-1)$ values or if the ($h_n$) minus ($h_{n-1}$) calculated liquid heights are outside the required tolerances, the two average liquid temperature values ($t_{aven}$) and $t_{ave}(n-1)$ are averaged and the calculation process is re-iterated until the required accuracy level is met.

This re-iteration process compensates for the complex and dynamic thermal distributions of circulating oil within the transformer that can only be approximated with the measured top and bottom oil temperatures.

For gas-blanketed transformers or reactors (FIG. 4): the oil pressure over the normal operating range above the critical low level is effectively constant over all temperature ranges due to the geometry of the tank and internal components in this level range. For calculation purposes, this can be referred to as ($P_0$).

The pressure of the gas ($P_g$) will vary as the liquid expands and contracts with temperature changes. Additionally, gas blanketed transformers or reactors can be subdivided into sealed type systems with a constant gas volume that retain a constant volume of gas, or inert gas pressure system types that exhausts gas as it compresses above a pressure relief value and replenishes gas as the lower pressure falls below the minimum level. With inert gas pressure system transformers or reactors, the gas pressure can change by an amount in the 1 psi range when the gas is exhausted or replenished. These rapid changes need to be recognized and ignored for the liquid level or volume calculations.

The baseline liquid level and gas pressure are measured when the transformer or reactor are filled with liquid and gas. The tank volume is a linear function of the tank height in the upper part above the critical low level, so the pressure of the gas above the liquid is a linear function of the height, enabling the liquid level to be calculated from the gas pressure.

The lower pressure ($P_b$) is the sum of the upper gas pressure ($P_g$) plus the pressure from the liquid ($P_0$). In the upper portion of the liquid where the liquid can expand and contract between normal high and normal low liquid levels, the geometry of the tank is simple and the relationship between changes in liquid height and volume are linear as well as the liquid specific gravity or density and thermal expansion. As a result, for the normal operating levels, the pressure from the liquid is essentially constant over the range of liquid levels from the critical low level to the high alarm level or higher. Consequently, the pressure from the liquid can be treated as a constant, ($P_o$) and the liquid level is calculated from the measured pressure of the gas ($P_g$) above the liquid. A loss of liquid volume is detected when the total pressure measured at the tank bottom is less than the upper gas pressure plus ($P_o$). The average liquid temperature can be calculated from the liquid level and initial temperature and level measurements.

Winding clamping condition monitor function: For winding clamping condition monitoring, the invention measures the high frequency vibrations sensed by the lower pressure sensor and filters the data into harmonic multiples of the power frequency or 2 times power frequency. The data must be associated with transformer loading levels or reactor voltage levels and compared to previous baseline data under similar conditions. An increase in the first, second and/or other lower harmonic vibration levels is an indication that the mechanical integrity of the winding clamping system has deteriorated. This could indicate an ejection or movement of winding spacers, compressive blocking, winding deformation or other adverse conditions.

Tank pressure monitoring function: For tank pressure monitoring, the normal operating range of bottom tank pressure is established and when the normal high pressure range limit is exceeded, the pressure at the pressure relief device level is calculated and monitored. If the pressure continues to increase, the system calculates the rate of pressure rise and the time expected until the level at the pressure relief device will reach the pressure relief device release rating and release or spill liquid.

Breather condition monitor function: For the breather condition monitor, for conservator type transformers, the pressure in the area above the oil or diaphragm will vary cyclically from a partial vacuum below ambient air pressure when the liquid is contracting from cooling and drawing air through the breather, to a partial pressure above ambient air pressure when the liquid is expanding from heating and expelling air through the breather. The present invention learns the normal range of vacuum and pressure when the breather is in good condition. When the breather becomes clogged or otherwise obstructed, the measured range of vacuum and pressure values is greater which is evaluated and issued as an alarm for breather maintenance.

For all transformer or reactor types: any reduction in the calculated oil volume that is not attributed to a cooling of the oil is an indication that oil is leaking, or has been removed, from the transformer.

The present invention requires settings programmed into non-volatile memory to enter the oil relative density, normal oil volumes and oil level and oil volume at the bottom of an expansion tank (if equipped) at 20° C., baseline oil pressure at the bottom of the tank, critical oil level, maximum and minimum designed oil temperatures, cooling system (if equipped with pumps, the pump operation sequence is also entered), oil preservation system and tank dimensions (tank dimensions for sealed or gas-blanket preservation systems, and expansion tank dimensions for conservator type preservation systems).

The critical oil level alarm is activated when the calculated oil level is below the critical oil level setting as a result of excessive thermal contraction or a loss of oil. This alarm can also be set to be activated when the oil pressure indicates a loss of oil that is above the critical oil level at the current average oil temperature, but would be below the alarm level at the minimum specified ambient or oil temperature.

The high oil level alarm is activated when the temperature corrected oil level, gas pressure and oil pressure calculations indicate an oil level above the designed maximum oil level setting. This alarm can also be set to be activated when the oil pressure indicates an excess quantity of oil, as a result of improper filling, for example, a level that is below the designed maximum oil level at the current average oil temperature, but would be above the alarm level at the maximum specified oil temperature.

The low oil level alarm is activated when the temperature corrected oil level, gas pressure, and oil pressure calculate an oil level below the designed minimum oil level setting. This alarm can also be set to be activated when the oil pressure indicates a loss of oil that is above the designed minimum oil level at the current average oil temperature, but would be below the alarm level at the minimum specified ambient temperature.

The loss of oil alarm is activated when the system calculates a loss of oil that is outside the bandwidth of the normal range and would indicate a loss of oil. The alarm issues a proactive warning to alert the operator to the condition before the liquid level falls to low or critical low levels indicating the present condition and the time expected before the level reaches low and critical low levels.

The tank pressure alarm is activated when the calculated pressure at the pressure relief device level is above normal and increasing. The alarm issues a proactive warning to alert the operator to the condition before the pressure reaches the critical level.

The ballistic impact alarm is issued if a high frequency impact (such as a bullet fired at the transformer) is detected in the oil pressure.

The breather condition alarm is activated if the normal range of pressure in the breather piping increases over the set tolerance level for normal breather condition.

I claim the following:

1. A process for determining a liquid oil level in a liquid-immersed power transformer without using a mechanical float or a mechanical oil level gauge, the process comprising the steps of:
    measuring an oil pressure at a bottom of the transformer oil filled tank;
    measuring a gas pressure above the oil in the transformer oil filled tank;
    calculate a liquid oil volume in the transformer oil filled tank using the measured oil pressure at the bottom of the tank and the measured gas pressure above the oil in the tank; and,
    calculate a liquid level of oil in the transformer oil filled tank.

2. The process for determining a liquid oil level in a liquid-immersed power transformer of claim 1, and further comprising the steps of:
    In a conservator type liquid-immersed power transformer, the process includes:
    estimating an initial average liquid temperature;
    calculating a liquid oil density at the average temperature;
    calculating a height of the liquid oil in the tank;
    calculating a liquid oil thermal volume from the liquid oil height and the tank geometry; and,
    calculating the average liquid oil temperature from the liquid oil thermal volume.

3. The process for determining a liquid oil level in a liquid-immersed power transformer of claim 1, and further comprising the steps of:
    in a gas blanketed type liquid-immersed power transformer, the process includes:
    calculating a gas volume within the tank from the pressure of the gas within the tank;
    calculating a liquid oil volume in the tank from the volume of the tank minus the gas volume of the tank;
    calculating an average liquid oil temperature; and, calculating the liquid oil level in the tank from the gas volume in the tank.

4. The process for determining a liquid oil level in a liquid-immersed power transformer of claim 1, and further comprising the steps of:

in a conservator type liquid-immersed power transformer, the process includes:

detecting for a leak in the tank includes calculating a percent liquid oil volume change;

calculating a liquid oil temperature change over a same period of time; and, comparing the percent liquid oil volume change to the liquid oil temperature change.

5. The process for determining a liquid oil level in a liquid-immersed power transformer of claim 4, and further comprising the steps of:

if the percent liquid oil volume change is not about equal to the liquid oil temperature change, then indicating an alarm that the oil level in the tank is low.

6. The process for determining a liquid oil level in a liquid-immersed power transformer of claim 1, and further comprising the steps of:

in a gas blanketed type liquid-immersed power transformer, the process includes:

detecting for a leak in the tank includes calculating a change in the liquid oil volume and a change in the liquid oil height in the tank;

determining if the liquid oil volume in the tank is decreasing; and, if the liquid oil volume in the tank is decreasing, then indicating an alarm that the liquid oil in the tank is leaking.

\* \* \* \* \*